United States Patent
Lee et al.

(10) Patent No.: US 10,778,706 B1
(45) Date of Patent: Sep. 15, 2020

(54) FRAUD DETECTION USING GRAPH DATABASES

(71) Applicant: Capital One Services, LLC, McLean, VA (US)

(72) Inventors: Jonathan Shek Wing Lee, Kitchener (CA); Vidhyasagar Mahadevan Harihara, North York (CA); Michelle Indyarta, Scarborough (CA); Tian Zou, Surrey (CA); Steve Frensch, Kitchener (CA)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/739,519

(22) Filed: Jan. 10, 2020

(51) Int. Cl.
*H04L 29/06* (2006.01)
*G06F 16/901* (2019.01)
*G06F 16/245* (2019.01)

(52) U.S. Cl.
CPC ........ *H04L 63/1416* (2013.01); *G06F 16/245* (2019.01); *G06F 16/9024* (2019.01); *H04L 63/1425* (2013.01)

(58) Field of Classification Search
CPC ............... G06F 16/9024; G06F 16/245; H04L 63/1416; H04L 63/1425
See application file for complete search history.

(56) References Cited

U.S. PATENT DOCUMENTS

| | | | |
|---|---|---|---|
| 7,562,814 B1 | 7/2009 | Shao et al. | |
| 9,294,497 B1 | 3/2016 | Ben-Or et al. | |
| 9,367,872 B1 * | 6/2016 | Visbal | G06F 3/0482 |
| 2005/0125339 A1 | 6/2005 | Tidwell et al. | |
| 2008/0243770 A1 | 10/2008 | Aasman | |
| 2008/0243908 A1 | 10/2008 | Aasman et al. | |
| 2009/0265106 A1 | 10/2009 | Bearman et al. | |
| 2010/0010826 A1 | 1/2010 | Rosenthal et al. | |
| 2011/0047044 A1 | 2/2011 | Wright et al. | |
| 2012/0096002 A1 | 4/2012 | Sheehan et al. | |
| 2012/0221581 A1 | 8/2012 | Narayanan et al. | |
| 2013/0024364 A1 | 1/2013 | Shrivastava et al. | |

(Continued)

OTHER PUBLICATIONS

Leman Akoglu et al, Graph-based Anomaly Detection and Description: A Survey, Apr. 28, 2014, pp. 1-68.

(Continued)

*Primary Examiner* — Daniel B Potratz
*Assistant Examiner* — Wu V Tran
(74) *Attorney, Agent, or Firm* — Banner & Witcoff, Ltd.

(57) ABSTRACT

Aspects discussed herein relate to the storage of data in graph databases and detecting fraudulent behavior in the stored data. Fraud detection systems may use graph databases to store data, allowing for querying the graph database to obtain data using a variety of graph semantics such as nodes, edges, and properties. Graph databases in accordance with embodiments of the invention may include account nodes and attribute nodes, where nodes of the same type are not directly linked to each other. When a particular node is updated, an updated node may be created with a higher version number than the existing node. Each node may include an indication of the node being associated with fraudulent activity. Fraud indicators may be calculated based on the relationships between the nodes and fraud indicators for the nodes.

19 Claims, 6 Drawing Sheets

(56) References Cited

U.S. PATENT DOCUMENTS

| | | |
|---|---|---|
| 2014/0040300 A1 | 2/2014 | Narayanan et al. |
| 2014/0244327 A1 | 8/2014 | Baldwin et al. |
| 2014/0244531 A1 | 8/2014 | Baldwin et al. |
| 2014/0279306 A1 | 9/2014 | Shi et al. |
| 2015/0244734 A1 | 8/2015 | Olson et al. |
| 2016/0019228 A1 | 1/2016 | Hong et al. |
| 2016/0125094 A1 | 5/2016 | Li et al. |
| 2016/0196615 A1* | 7/2016 | Yen ................. G06Q 20/401 705/30 |
| 2017/0111506 A1 | 4/2017 | Strong et al. |
| 2017/0178139 A1 | 6/2017 | Gieseke |
| 2019/0311367 A1 | 10/2019 | Reddy et al. |
| 2020/0005195 A1* | 1/2020 | Fang ..................... G06N 20/00 |
| 2020/0034853 A1* | 1/2020 | Lim ................. G06Q 20/4016 |
| 2020/0076810 A1* | 3/2020 | Watts ................... H04L 41/50 |
| 2020/0145436 A1* | 5/2020 | Brown ............... G06F 16/2379 |

OTHER PUBLICATIONS

Charu Aggarwal et al, Evolutionary Network Analysis: A Survey, ACM Comput. Surv. 47, 1, Article 10, Apr. 2014, pp. 1-36.
Aug. 4, 2020—(US) Final Rejection—U.S. Appl. No. 16/739,825.

* cited by examiner

FRAUD DETECTION USING GRAPH DATABASES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to data storage and more specifically to graph databases.

BACKGROUND

Fraud detection is a set of activities undertaken to determine attempts to gain access to one or more accounts. One common type of fraud in banking is customer account takeover, where someone illegally gains access to a victim's bank account. Other examples of fraud include the use of false identities and money laundering.

Aspects described herein may address these and other problems, and generally improve the quality, efficiency, and speed of fraud detection by improving the ability of a system to store and process data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects discussed herein relate to the storage of data in graph databases and detecting fraudulent behavior in the stored data. Fraud detection systems may use graph databases to store data, allowing for querying the graph database to obtain data using a variety of graph semantics such as nodes, edges, and properties. Graph databases in accordance with embodiments of the invention may include account nodes and attribute nodes, where nodes of the same type are not directly linked to each other. That is, account nodes are not linked to other account nodes and attribute notes are not linked to other attribute nodes. When a particular node is updated, an updated node may be created with a higher version number than the existing node. The updated node may then be linked while preserving the previous version(s) of the node. Each node may include an indication of the node being associated with fraudulent activity. Fraud proximity scores (and other fraud indicators) may be calculated based on the relationships between the attribute nodes, address nodes, and fraud indicators within the graph database.

Fraud may be detected by identifying situations where a fraudster is reusing permutations of (possibly stolen) credentials to open new accounts or to perform account takeovers. For example, a fraudster may use the same mailing address to open multiple accounts and/or take over an existing account by changing the mailing address on file to a fraudulent address in order to receive a new card in the mail. When the request to update the mailing address node for the account is received, the existing address node may be replicated and the new version of the address node may be created with the fraudulent mailing address. The account node may be connected to previous versions of the address nodes by an immutable linking feature, such as account number, such that the account node is associated with each version of the address nodes. Particular versions of the address node, such as the updated version inserted by the fraudster in this example, may be marked as fraudulent. In this way, accounts associated with the fraudulent versions of the address node may be identified. Additionally, when the account is recovered and a non-fraudulent address is associated with the account, the previously fraudulent address attribute node may be maintained as a historical record of the fraudulent activity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
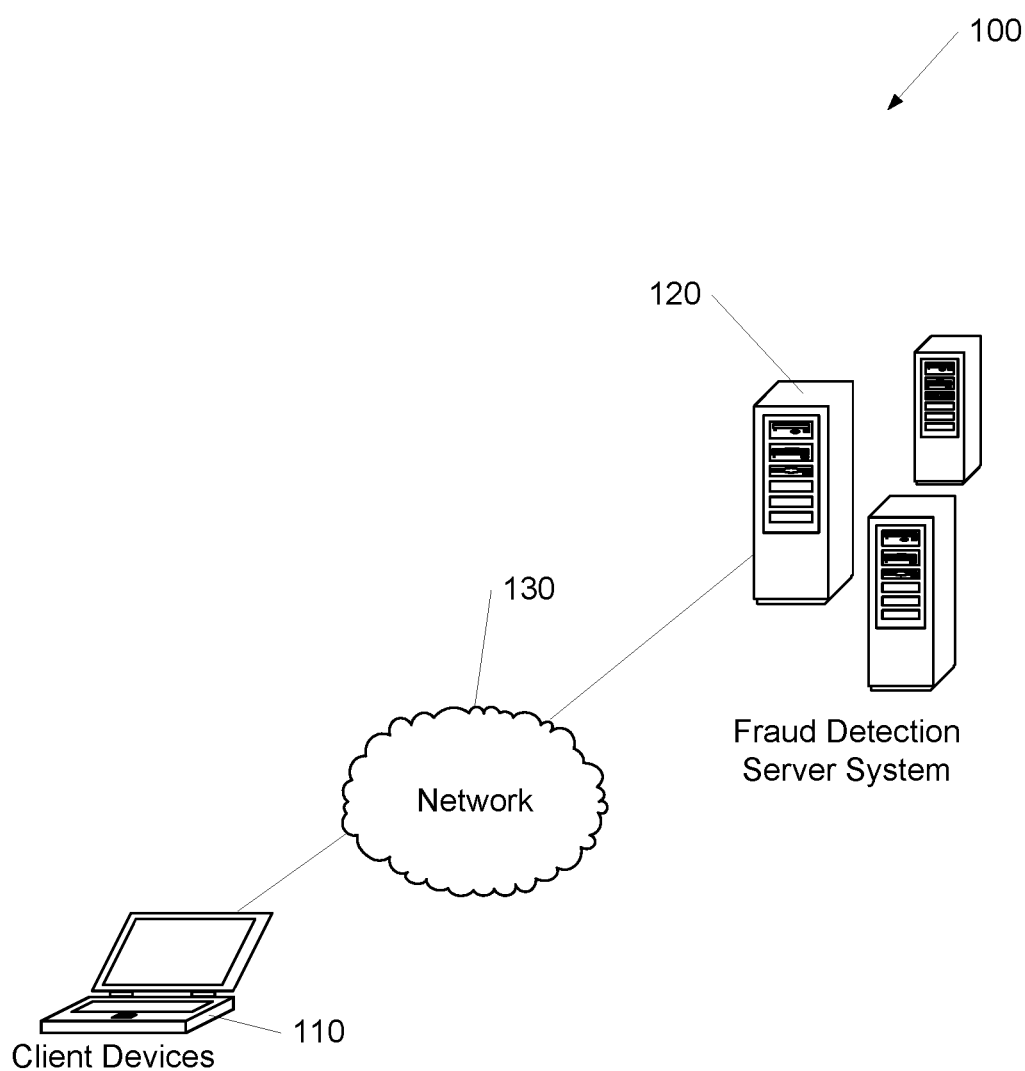
FIG. 1 illustrates an example of a fraud detection system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein relate to storing data using graph databases and identifying fraudulent behavior within the stored data. Fraud detection systems may use graph databases to store data, allowing for querying the graph database to obtain data using a variety of graph semantics such as nodes, edges, and properties. Graph databases in accordance with embodiments of the invention may include account nodes and attribute nodes, where nodes of the same type are not directly linked to each other. That is, account nodes are not linked to other account nodes and attribute notes are not linked to other attribute nodes. When a particular node is updated, an updated node may be created. The updated node may then be linked to a copy of an account node with a higher version number, allowing the preservation of previous states of the account. Each node may include an indication of the node being associated with fraudulent activity.

Fraud may be detected by identifying situations where a fraudster is reusing permutations of (possibly stolen) credentials to open new accounts or to perform account takeovers. For example, a fraudster may use the same mailing address to open multiple accounts and/or take over an existing account by changing the mailing address on file to a fraudulent address in order to receive a new card in the mail. When the associated mailing address node for the account is changed, the account node may be replicated and the new address node may be created with the fraudulent mailing address. The address node is connected to previous versions of the address nodes through a connection to an account node by an immutable linking feature, such as account number. Particular versions of the account node, such as the updated version created as a result of the fraudster updating an address in this example, may be marked as fraudulent. In this way, addresses associated with the fraudulent versions of the account node may be identified. Additionally, when the account is recovered and a non-fraudulent address is associated with the account, the previously fraudulent address attribute node may be maintained as a historical record of the fraudulent activity. However, it should be noted that any of a variety of data, such as customer name, phone numbers, date of birth, etc. may be utilized as described in more detail herein.

Fraud proximity scores (and other fraud indicators) may be calculated based on the relationships between the attribute nodes, account nodes, and fraud indicators within the graph database. In existing fraud systems, accounts are forever penalized for being associated with fraudulent activity. Fraud detection systems in accordance with embodiments of the invention allows for a separation between the fraudulent activity and legitimate accounts, thereby improving the ability of the fraud detection systems to store data, particularly historical changes to particular nodes within the graph database, and accurately determine current and historical fraudulent activity. In several embodiments, fraudulent activity may be identified based on a fraud proximity score. The fraud proximity score may be used to dynamically rate particular nodes for fraudulent activity from the perspective of a particular node within the graph database. In a number of embodiments, data being stored in the graph database may be preprocessed into a common format, thereby facilitating easy comparison and scoring of the data. Additionally, whitelists may be used to drop common/not useful attributes from the data, thereby improving the efficiency of the graph database to store data and eliminating potential false indicators of fraudulent activity.

FIG. 1 illustrates a fraud detection system 100 in accordance with an embodiment of the invention. The fraud detection system 100 includes at least one client device 110 and/or at least one fraud detection server system 120 in communication via a network 130. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may provide data to and/or obtain data from the at least one fraud detection server system 120 as described herein. Fraud detection server systems 120 may store and process a variety of data as described herein. The network 130 may include a local area network (LAN), a wide area network (WAN), a wireless telecommunications network, and/or any other communication network or combination thereof.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in the fraud detection system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the fraud detection system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the fraud detection system 100 in front of one or more computing devices such that any external devices may communicate directly with the specialized hardware.

Figure 2:
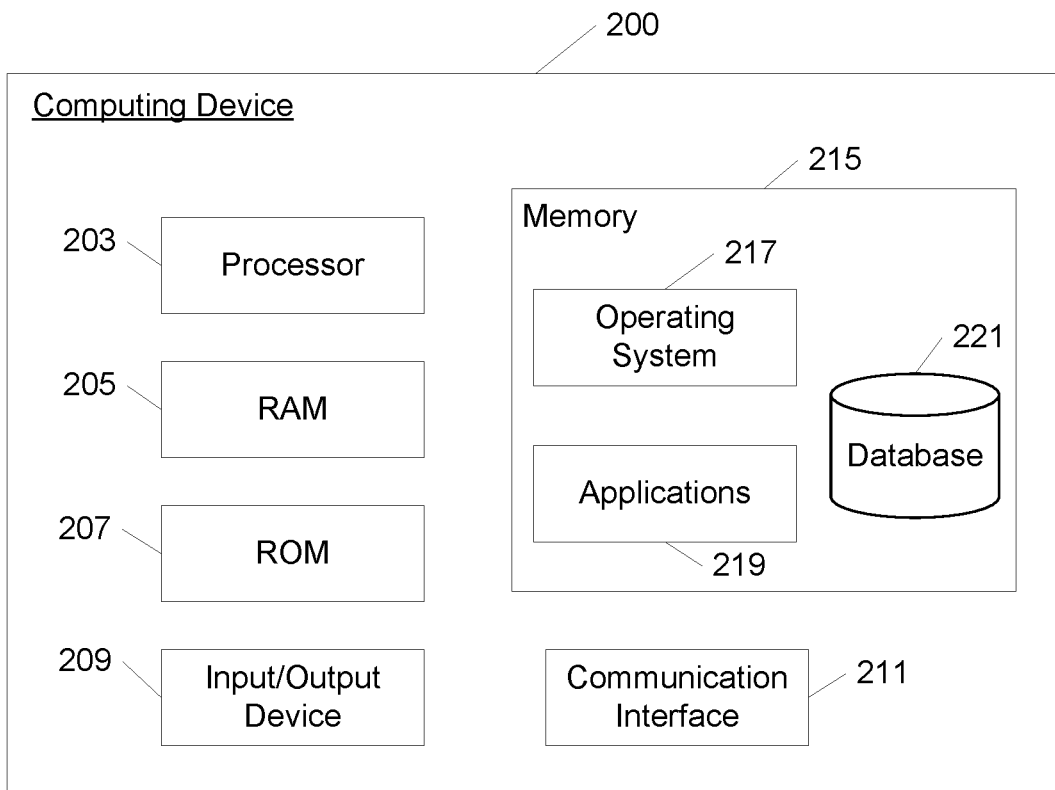
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
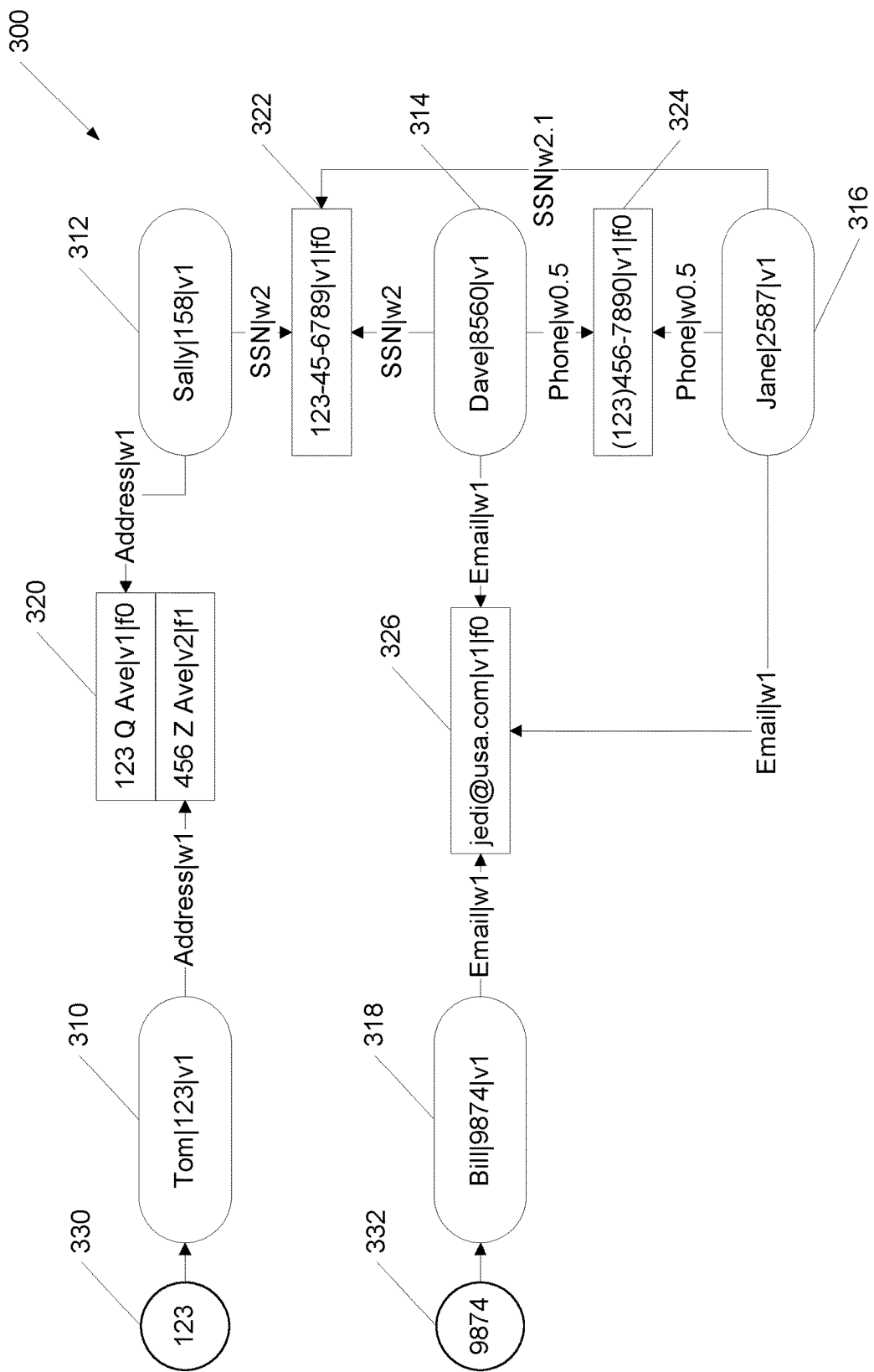
FIG. 3 illustrates an example graph database in accordance with one or more aspects described herein.

FIG. 3 depicts an example graph database in accordance with one or more aspects described herein. The graph database 300 includes account node 310, labeled Tom with account number 123 and version 1, account node 312, labeled Sally with account number 158 and version 1, account node 314, labeled Dave with account number 8560 and version 1, account node 316, labeled Jane with account number 2587 and version 1, and account node 318, labeled Bill with account number 9874 and version 1. Graph database 300 also includes attribute node 320, having two versions: version 1 having value "123 Q Avenue" and a fraud indicator of 0, version 2 having value "456 Z Ave" with a fraud indicator of 1. Graph database 300 further includes attribute node 322, version 1 with value "123-45-6789" and a fraud indicator of 0, attribute node 324, version 1 with value "(123) 456-7890" and a fraud indicator of 0, and attribute node 326, version 1 with value "jedi@usa.com" and a fraud indicator of 0. Graph database 300 also includes query node 330, having identifier 123 and associated with account node 310 and query node 332, having identifier 9874 and associated with account node 318. It should be noted that, in a variety of embodiments, each account node includes an associated query node that may be used to query the graph database as described herein. However, it should be noted that, depending on the requirements of specific embodiments of the invention, that the account nodes and/or attribute nodes may or may not be versioned. For example, some embodiments of the invention may have versioned account nodes but not versioned attribute nodes. Similarly, a variety of embodiments of the invention may employ versioned attribute nodes but not versioned attribute nodes. Several embodiments of the invention may include versioning for both account nodes and attribute nodes.

Account nodes may include a unique identifier and static information for an account, such as customer name, date of birth, a fraudulent flag, a version number, account status, account number, account open date, account closed date, and the like. The unique identifier may use as a primary key for the account node. An account status may indicate the current status of an account such as, but not limited to, open, closed, and voluntarily closed. Attribute nodes may include a value, a version number, and a fraudulent flag. The value may be used as the primary key of the attribute node. Attribute nodes may be associated with dynamic information of an account such as, but not limited to, mailing address, email address, social security number, phone number, etc. In many embodiments, an attribute node includes a label indicating the class of data stored in the attribute node. In a variety of embodiments, the data stored in an attribute node may be disambiguated to differentiate different data types that may be confusingly similar, such as social security numbers and phone numbers. Attribute nodes may be linked to account nodes via an edge having a label and a weight. The label of the edge may indicate the class of data stored using the attribute node. For example, if an attribute node stores a social security number, the corresponding edges may have the label "SSN." However, the label on an edge need not correspond to the data type of the corresponding attribute node. The weight of an edge may be pre-determined and/or determined dynamically based on its associated account nodes and/or attribute nodes. An edge weight may be any value, including positive and negative values. In a variety of embodiments, the weight of an edge is modified based on a fraud proximity score and/or whitelist as described in more detail herein.

As account nodes may only be connected to attribute nodes within graph database 300, account-to-account connections are an even number of levels deep. This structure of the graph database may be used to discover connections to known fraud accounts when querying the graph database 300. For example, Bill's two-level deep connections will return Dave (account node 314) and Jane (account node 316), while Bill's four-level deep connections will return Sally (account node 312) and Jane (account node 316). Multiple account nodes may link to the same attribute node and/or various versions thereof. For example, multiple people may live at the same address. Nodes are linked using edges indicating a relationship between the linked nodes and having a label indicating a particular attribute described by the relationship. For example, account node 310 is linked to version 2 of attribute node 320 via an edge having a label of "Address," thereby indicating that account 123 has an address of 456 Z Ave. Similarly, account node 312 is linked to version 1 of attribute node 320 via an edge having a label of "Address," thereby indicating that account 158 has an address of 123 Q Ave. In the illustrated embodiment, a fraud indicator of zero may be used to indicate a non-fraudulent account and a fraud indicator of one may be used to indicate a fraudulent account. However, it should be noted that any fraud indicator, including fraud indicators that utilize more than two values to indicate a degree of fraudulence associated with a node, may be used.

Figure 4:
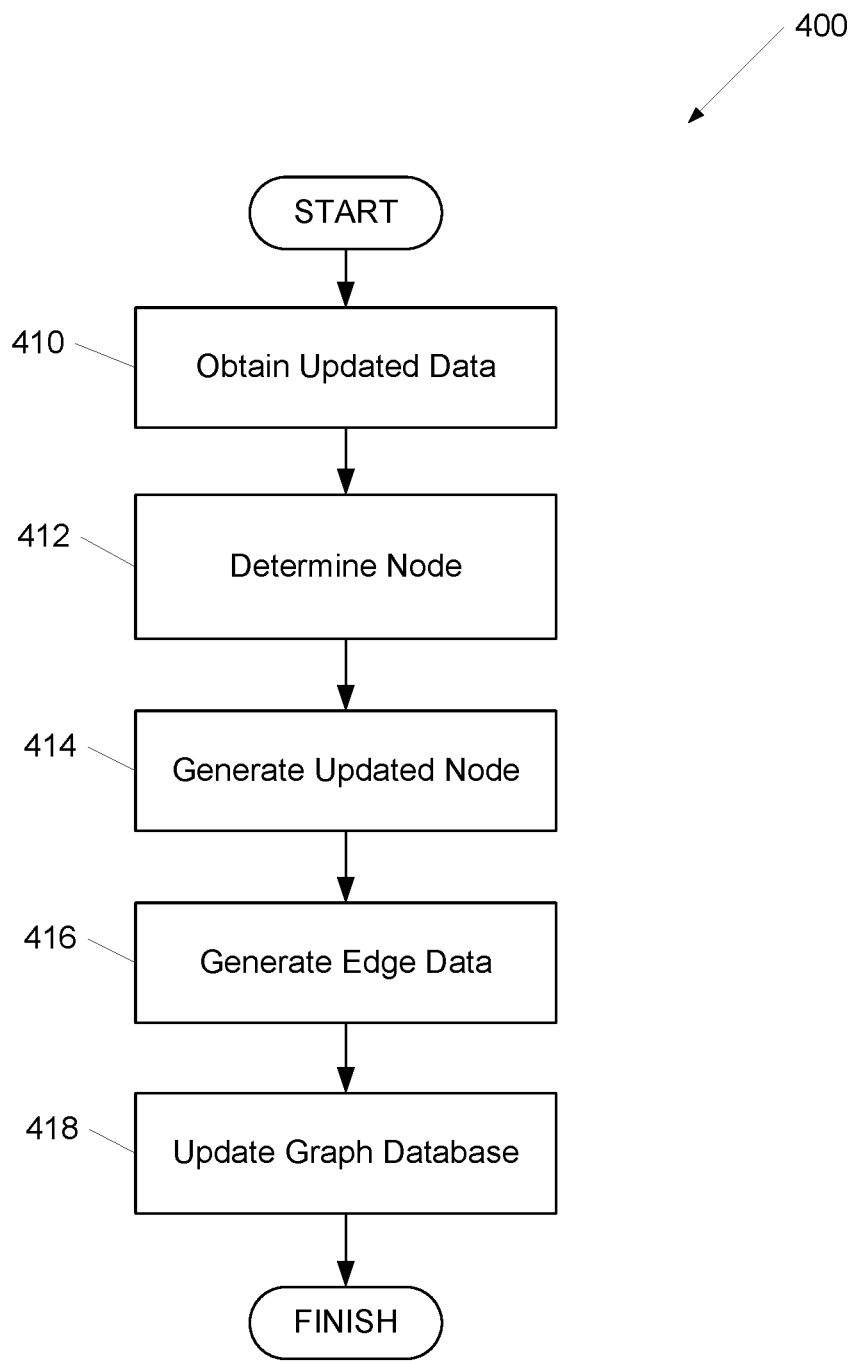
FIG. 4 depicts a flow chart for inserting data into a graph database according to one or more aspects of the disclosure.

FIG. 4 depicts a flow chart for inserting data into a graph database according to one or more aspects of the disclosure. Some or all of the steps of process 400 may be performed using any of the computing devices and/or combination thereof described herein. In a variety of embodiments, some or all of the steps described below may be combined and/or divided into sub-steps as appropriate.

At step 410, updated data may be obtained. In several embodiments, the updated data is obtained from a computing device associated with a particular account. The updated data may be regarding an account and/or a particular property of the account. The updated data may update data already associated with an account and/or add new data to an account. Any property of an account, including those described herein, may be added and/or updated. In many embodiments, the updated data is preprocessed using one or more of a variety of techniques, such as those described in more detail with respect to FIG. 6. In a variety of embodiments, the updated data indicates that a particular attribute of an account has been flag as fraudulent or non-fraudulent.

At step 412, a node may be determined. The node may be determined based on the updated data. In several embodiments, the updated data includes an indication of the class of data being updated and the class indication may be used to determine an appropriate node. In several embodiments, the updated data includes an account number that may be used to identify a particular node, such as an account node and/or attribute node, to be updated based on the updated data. In a variety of embodiments, the updated data is associated with a particular account node and adds a new attribute to the associated account. In a number of embodiments, the updated data may not be associated with any account nodes current stored using a graph database.

At step 414, an updated node may be generated. In a variety of embodiments, the updated data contains updated data for an existing node. An updated node may be generated based on an existing node and the updated data, where the updated node has a higher version number than the existing node. In this way, the updated node is associated with the corresponding existing node. For example, if the updated data includes a new address for an account, an account attribute node may be created and linked to the address with the updated data and a version indicator determined based on the version of the previous account attribute node. When the updated data is not associated with any node within the graph database, the updated data may include a new node to be inserted into the graph database.

At step 416, edge data may be generated. The generated edge data may indicate the relationship between the account node indicated in the updated data and the updated node. The generated edge data may have a label corresponding to the class of data indicated in the updated data. The generated edge data may have a weight determined based on the label of the edge data and/or any other criteria, such as the difference in time between when the previous node was created and the updated data was received. For example, a recent change to a particular attribute of an account may be indicative of fraud, and more recently created edges may be given a greater weight in determining a fraud proximity score for an account. In several embodiments, the updated node includes an account node and the generated edge data may link the updated account node to a query node associated with the account node. In this way, a query node may link to every version of an account node, thereby facilitating the querying of different versions of an account stored within a graph database.

At step 418, the graph database may be updated. The graph database may be updated to store the updated node and edge data. In several embodiments, updating the graph database includes adding a new version to an existing node and updated edge data to link particular account nodes to the new version of the existing node. In a number of embodiments, updating the graph database includes adding newly created nodes to the graph database and associating existing nodes to the newly created nodes using the generated edge data. In many embodiments, when a newly created account node is added to the graph database, a new query node may be generated based on the newly created account node and the new query node may also be added to the graph database.

Figure 5:
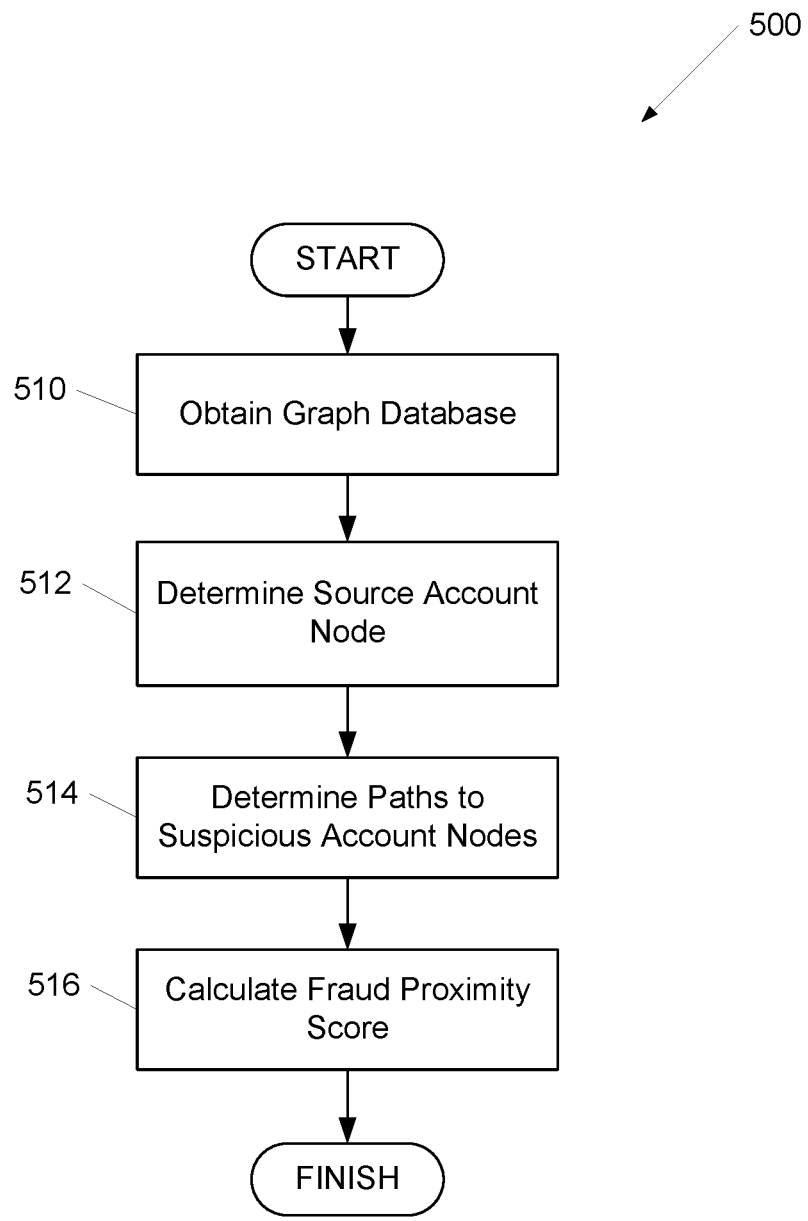
FIG. 5 depicts a flow chart for calculating a fraud proximity score according to one or more aspects of the disclosure.

FIG. 5 depicts a flow chart for calculating a fraud proximity score according to one or more aspects of the disclosure. Some or all of the steps of process 500 may be performed using any of the computing devices and/or combination thereof described herein. In a variety of embodiments, some or all of the steps described below may be combined and/or divided into sub-steps as appropriate.

At step 510, a graph database may be obtained. The graph database may be obtained from any of a variety of computing devices as described herein. The graph database may contain data for a variety of accounts, stored using a set of account nodes and attribute nodes as described herein. The graph database may be queried to determine features within the graph database. For example, a graph database may be queried to determine a number of unique account attributes (e.g. account numbers, social security numbers, etc.) stored in the graph database, the size of the graph database, and any of a variety of other queries. In several embodiments, a graph database may be queried to calculate a fraud proximity score for a particular account.

At step 512, a source account node may be determined. The source account node may be the account node for which a fraud proximity score is to be calculated. In several embodiments, the source account node is determined by querying the graph database to determine a query node linking to one or more versions of the account node. The query node may be used to determine a particular version of the associated account node to be used as the source account node.

At step 514, one or more paths to suspicious account nodes may be determined. An account node may be indicated as suspicious when one or more attribute nodes associated with the account node have a fraud indicator set. In several embodiments, an account node includes a suspicious account indicator that identifies a particular account node as being suspicious. In several embodiments, the paths to suspicious account nodes are determined using the source account node as the root node of a graph traversal algorithm. Any of a variety of graph traversal algorithms, such as depth-first search and breadth-first search, may be used to determine a path from the source account node to a suspicious account node. In several embodiments, a path to a suspicious account node may be determined by finding a path from the source account node to an attribute node with a fraud indicator set, then determining the set of account nodes linked to the attribute node by at least one edge. The fraud indicator may be set for a particular version of an attribute node linked to the attribute node and/or to a different version of the account node that is not directly linked to the attribute node. The linked account nodes may be indicated as suspicious account nodes based on their relationship to the fraudulent attribute node. For example, a large number of accounts linked on a common IP address may have many paths to suspicious account nodes even if the majority of accounts are not fraudulent At step 516, a fraud proximity score may be calculated. The fraud proximity score may be calculated based on the number of paths to suspicious account nodes and/or the magnitude of the suspiciousness of a particular account node. For example, account nodes that are indicated as suspicious based on a relationship to a fraudulent social security number attribute node may be more likely to be fraudulent than account nodes that are indicated as suspicious based on a relationship to a fraudulent address attribute node. In many embodiments, the degree to which a particular node is indicated as suspicious may be determined based on the edge weight for the edge connecting the account node to the attribute node. In a variety of embodiments, the degree to which a particular node is indicated as suspicious may be determined based on how far removed the linked version of the attribute node to the account node is from the version of the attribute node indicated as fraudulent. For example, an account node linked to fraudulent account through an intermediary account is less suspicious than one that is directly linked to the fraudulent account. In a variety of embodiments, the contribution of edge-weights decays as the depth increases. The fraud proximity score may be normalized based on a percentage of all paths within the graph database that end at a fraudulent node and/or a suspicious account node.

In a number of embodiments, a fraud proximity score for a source account node ($FPS_A$) is given using the following equation:

$$FPS_A = \left[\sum_{R \in P_A} \prod_{r \in R}^{n_R} \lambda^{depth(r_R)} \times e_r\right] \times \left[\frac{n_{P_A}}{n_{P_A} + \overline{n_{P_A}}}\right]$$

where $P_A$ is the set of all possible paths from source account node A to suspicious account nodes, $n_{P_A}$ is the number of paths in $P_A$, $\overline{n_{P_A}}$ is the number of paths connecting the source node to non-fraudulent accounts, $n_R$ is the length of path R, r is each relationship in path R, $\lambda$ is a decay factor, and $e_r$ is the edge weight of relationship r in path R. The depth of $r_R$ may be determined based on the distance from the source node to the relationship r.

In a variety of embodiments, the decay factor is a number between zero and one with a default value of 0.5. In several embodiments, particular relationships between nodes may be excluded from the calculation of a fraud proximity score by setting the edge weight of the corresponding edge to zero. The fraud proximity scores can be associated with and/or stored using the source node. In several embodiments, when the fraud proximity score for the source node exceeds a threshold value, the source node can be indicated as fraudulent. The threshold value can be pre-determined and/or determined dynamically based on the fraud proximity scores for multiple nodes within the graph database.

Figure 6:
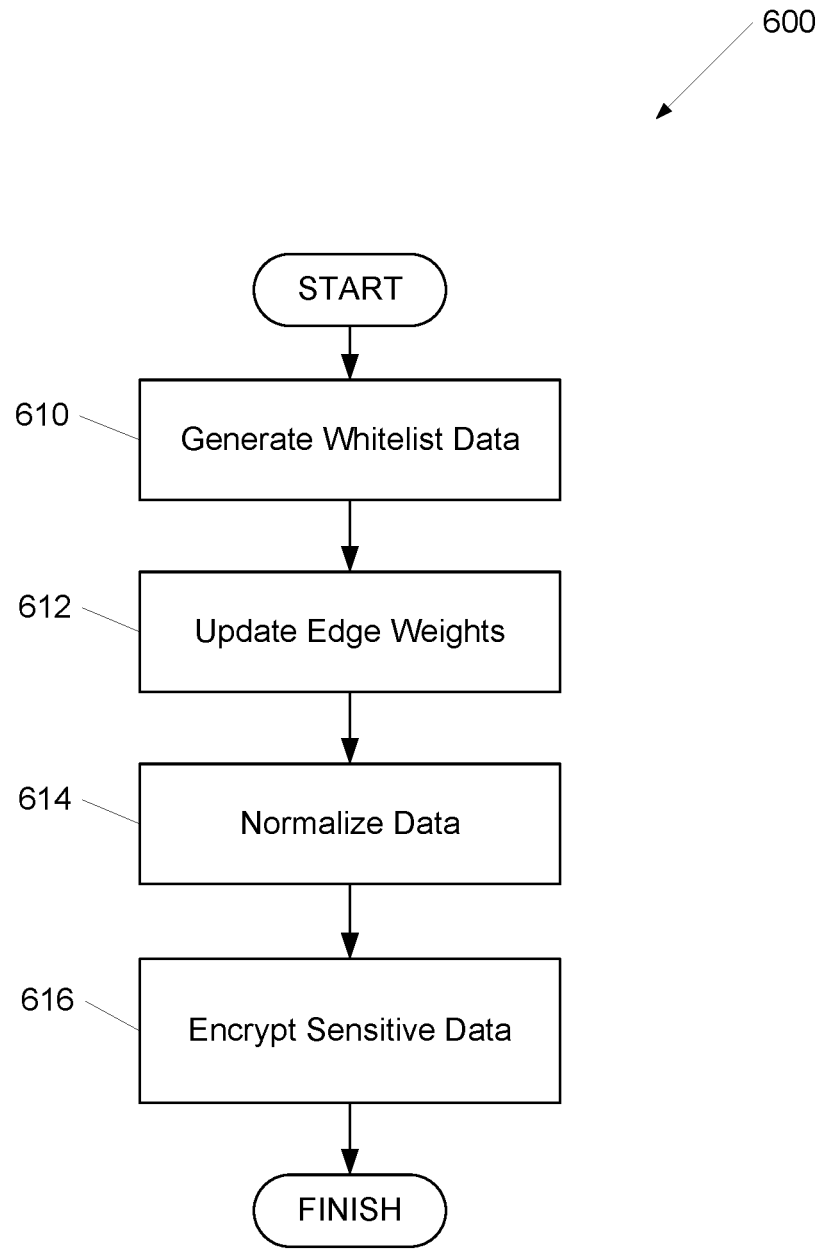
FIG. 6 depicts a flow chart for preprocessing data according to one or more aspects of the disclosure.

FIG. 6 depicts a flow chart for preprocessing data according to one or more aspects of the disclosure. Some or all of the steps of process 600 may be performed using any of the computing devices and/or combination thereof described herein. In a variety of embodiments, some or all of the steps described below may be combined and/or divided into sub-steps as appropriate.

At step 610, whitelist data may be generated. Whitelist data may be used to filter common, default, and/or invalid values from data to be stored and/or stored using a graph database. For example, a default invalid email address may be used during an account creation and any account node linking to an email attribute node having the default email address may be considered to not have an associated email address. The whitelist data may be pre-determined and/or determined dynamically based on the data stored in the graph database. Pre-determined whitelists may include known and/or default values, such as default phone numbers, default email address, and/or any other default value for any attribute associated with an account. Dynamic whitelists may be automatically generated based on the frequency of which a piece of data occurs within the graph database and the fraud rate associated with the piece of data. That is, if an attribute is shared by many accounts but none of the associated accounts are suspicious and/or fraudulent, the attribute may be ignored (e.g. whitelisted) from processing, such as when processing fraud proximity scores. The threshold for fraud rate and/or frequency may be determined dynamically and the dynamic whitelist may be regenerated periodically (and/or on demand) to ensure that the values stored using the dynamic whitelist are accurate. If there are some fraudulent accounts associated with a particular attribute, a threshold value of fraudulent activity associated with the attribute may need to be reached before an attribute is removed from the dynamic whitelist.

At step 612, edge weights may be updated. Edge weights may be updated based on the generated whitelist data. For example, certain types of relationships may be excluded by setting the weight of edges corresponding to the relationship to zero. These whitelisted attributed nodes are shared by many accounts and do not generate useful networks, such as those for determining fraud proximity scores. By removing these relationships, the ability of fraud detection systems to identify fraud within graph databases is improved by reducing the amount of data to be processed and removing noise from the generated fraud proximity scores.

At step 614, data may be normalized. Data may be normalized by converting the data to a common format and/or removing special characters from the data. For example, provided account numbers, telephone numbers, addresses, and the like may be provided in a variety of formats that do not allow for easy matching between different pieces of data of the same class. For example, the following addresses may refer to the same geographic location but do not match: 123 Main Street Suite 200b and Unit 200 B 123 Main St. Data may be normalized based on rules for particular classes of data, such that every piece of data of a particular class is formatted using a common format. For example, for address data, address lines may be merged into a single line, apartment number formatting may be standardized, and street types and directions may be formatted using common wording and punctuation. Returning to the previous example, both addresses may be normalized to 200B-123 Main Street. Any of a variety of rules, such as total number of lines of data, casing requirements (e.g. all uppercase, all lowercase, all sentence case, etc.), removing accented characters and/or converting accented characters to their non-accented equivalents, converting words in foreign languages into a standardized language (e.g. converting French words to English), and the like may be used. Normalizing data prior to inserting the data into the graph database may allow for improved fraud detection by allowing for fuzzy linking of the data, thereby improving the accuracy of the determined fraud proximity scores.

At step 616, sensitive data may be encrypted. It may be desirable to encrypt particular classes of data, such as those associated with personally identifiable information standards, to improve the security of graph databases. In several embodiments, sensitive data may be encrypted by salting the data with a random string and hashing the salted data. Any of a variety of hashing algorithms, such as MD5, MD6, SHA-2, and SHA-3, may be used. The use of the salt ensures that the hash cannot be reversed without knowing the salt, which is not stored. Salting is particularly important for linking attributes that existing in a finite domain space (such as phone numbers that consist of exactly 10 numeric digits) as an unsalted hash may easily be reversed through brute force. The sensitive data may be decrypted by applying the hashing function to the encrypted data when the salt is known. In a variety of embodiments, the sensitive data may be re-encrypted on a schedule using a different salt value, such as a nightly encryption of sensitive data using a newly generated salt value. In this way, even if the salt value is discovered, the encrypted data is only vulnerable for a short time. The hashing of the data allows for fuzzy matching of normalized attributes, as each matching attribute will hash to the same value. This allows for the matching of data even when the underlying data values are not known.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
obtaining, by a fraud detection device, a fraud detection database comprising:
a set of account nodes, each account node in the set of account nodes comprising:
a unique identifier;
an account number;
version data; and
a suspicious account indicator indicating if the account node corresponds to a suspicious account;
a set of attribute nodes, each attribute node in the set of attribute nodes comprising a value;
a set of edge data, each edge in the set of edge data linking an account node to an attribute node and comprising:
a label corresponding to the value in the attribute node; and
an edge weight;
a set of query nodes, each query node in the set of query nodes comprising an account number from the set of account nodes; and
a set of query edge data, each query edge in the set of query edge data linking a query node to the account node having the account number corresponding to the account number in the linked query node;
obtaining, by the fraud detection device, revised account data comprising a revised account number;
determining, by the fraud detection device, a corresponding account node, in the set of account nodes, having an account number corresponding to the revised account number;
generating, by the fraud detection device, a revised account node comprising a unique identifier, the revised account number, a suspicious account identifier, and version data indicating that the revised account node is a later version of the corresponding account node;
generating, by the fraud detection device, revised edge data based on the edges linking the corresponding account node to an attribute node in the set of attribute nodes;

13 inserting, by the fraud detection device, the revised account node into the fraud detection database;
inserting, by the fraud detection device, the revised edge data, wherein each edge in the revised edge data links the revised account node to each attribute node indicated in the revised edge data;
inserting, by the fraud detection device, a revised query edge into the set of query edge data, the revised query edge linking the revised account node to the query node having an account number corresponding to the account number of the revised account node;
obtaining, by the fraud detection device, corrective account data comprising a corrective account number;
determining, by the fraud detection device, that the account number of the corrective account data corresponds to the account number of the revised account node;
generating, by the fraud detection device, a corrective account node comprising a unique identifier, the corrective account number, a suspicious account identifier, and version data indicating that the corrective account node is a later version of the revised account node;
setting, by the fraud detection device, the suspicious account indicator for the revised account node such that the revised account node is indicated as a suspicious account;
generating, by the fraud detection device, corrective edge data based on the edges linking the corresponding account node to an attribute node;
inserting, by the fraud detection device, the corrective account node into the fraud detection database;
inserting, by the fraud detection device, the corrective edge data, wherein each edge in the corrective edge data links the corrective account node to the same attribute nodes as the corresponding account node; and
inserting, by the fraud detection device, a corrective query edge linking the corrective account node to the query node having an account number corresponding to the corrective account number.

2. The method of claim 1, further comprising preprocessing, by the fraud detection device, an attribute node in the set of attribute nodes to format the value of the attribute node in a standardized format based on the label indicated in the edge linking the attribute node to an account node.

3. The method of claim 1, further comprising:
identifying, by the fraud detection device, an abbreviated keyword in an attribute node; and
updating, by the fraud detection device, the value of the attribute node to replace the abbreviated keyword with a standardized keyword determined based on the label indicated in the edge linking the attribute node to an account node.

4. The method of claim 1, further comprising encrypting, by the fraud detection device, the value for each attribute node based on a random string and a hashing algorithm.

5. The method of claim 4, further comprising:
regenerating, by the fraud detection device, the random string on a predetermined schedule; and
encrypting, by the fraud detection device, the value for each attribute node based on the regenerated random string and the hashing algorithm on the predetermined schedule.

6. The method of claim 1, further comprising:
determining, by the fraud detection device, a whitelist comprising a set of values occurring in the set of attribute nodes; and

14 deleting, by the fraud detection device and from the fraud detection database, attributes nodes having a value corresponding to the set of values in the whitelist.

7. The method of claim 6, further comprising determining, by the fraud detection device, the set of values in the whitelist based on a number of times the value occurs in an attribute node in the set of attribute nodes.

8. The method of claim 6, further comprising determining, by the fraud detection device, the set of values in the whitelist based on a set of default values corresponding to a particular label associated with one or more edges in the set of edge data.

9. The method of claim 1, further comprising querying, by the fraud detection device, the fraud detection database by:
obtaining an account identifier;
mapping the account identifier to an account number;
obtaining a related query node associated with the account number;
determining a current account node based on the account nodes linked to the related query node, wherein the current account node comprises the account node linked to the related query node and having version data indicating the current account node is the latest version;
determining a set of related attribute nodes based on a set of attribute notes linked to the current account node; and
generating a query result based on the current account node and the set of related attribute nodes.

10. A non-transitory machine-readable medium storing instructions that, when executed by one or more processors, cause the one or more processors to perform steps comprising:
obtaining a fraud detection database comprising:
a set of account nodes, each account node in the set of account nodes comprising:
a unique identifier;
an account number;
version data; and
a suspicious account indicator indicating if the account node corresponds to a suspicious account;
a set of attribute nodes, each attribute node in the set of attribute nodes comprising a value;
a set of edge data, each edge in the set of edge data linking an account node to an attribute node and comprising:
a label corresponding to the value in the attribute node; and
an edge weight;
a set of query nodes, a query node in the set of query nodes comprising an account number from the set of account nodes; and
a set of query edge data, each query edge in the set of query edge data linking a query node to the account node having the account number corresponding to the account number in the linked query node;
obtaining updated account data comprising an updated account number;
determining a corresponding account node in the set of account nodes, where the corresponding account node has an account number corresponding to the updated account number;
generating an updated account node comprising a unique identifier, the updated account number, a suspicious account identifier, and version data incremented based on the version data for the corresponding account node;

generating updated edge data based on the edges linking the corresponding account node to an attribute node;

inserting the updated account node into the fraud detection database;

inserting the updated edge data, wherein each edge in the updated edge data links the updated account node to an attribute node in the set of attribute nodes;

inserting an updated query edge linking the updated account node to the query node having the same account number as the updated account node;

obtaining corrective account data comprising an account number;

determining that the account number of the corrective account data corresponds to the account number of the updated account node;

generating a corrective account node comprising a unique identifier, the account number, a suspicious account identifier, and version data incremented based on the version data for the updated account node;

setting the suspicious account indicator for the updated account node such that the updated account node is indicated as a suspicious account;

generating corrective edge data based on the edges linking the corresponding account node to an attribute node;

inserting the corrective account node into the fraud detection database;

inserting the corrective edge data, wherein each edge in the updated edge data links the corrective account node to an attribute node in the set of attribute nodes; and inserting a corrective query edge linking the corrective account node to the query node having the same account number as the corrective account node.

11. The non-transitory machine-readable medium of claim 10, wherein the instructions, when executed by one or more processors, further cause the one or more processors to perform step comprising determining the edge weight for each edge in the set of edge data based on the label of the edge.

12. The non-transitory machine-readable medium of claim 10, wherein the instructions, when executed by one or more processors, further cause the one or more processors to perform steps comprising:

obtaining whitelist data comprising a set of whitelist values; and for each attribute node in the fraud detection database having a value corresponding to a whitelist value in the whitelist data, setting the edge weight of each edge linking the attribute node to an account node to zero.

13. The non-transitory machine-readable medium of claim 10, wherein the instructions, when executed by one or more processors, further cause the one or more processors to perform step comprising calculating, for each account node in the set of account nodes, a fraud proximity score based on the edge weights for each edge between the account node and at least one account node indicated as a suspicious account based on the suspicious account indicator for the account node.

14. The non-transitory machine-readable medium of claim 13, wherein the instructions, when executed by one or more processors, further cause the one or more processors to perform step comprising normalizing the fraud proximity score for an account node based on a total number of paths that end at an account node indicated as suspicious within the fraud detection database.

15. The non-transitory machine-readable medium of claim 13, wherein the instructions, when executed by one or more processors, further cause the one or more processors to perform step comprising calculating the fraud proximity score for an account node based on a length of a relationship from the account node to the at least one account node indicated as suspicious and a total number of paths that end at the at least one account node indicated as suspicious and originating from the account node.

16. A fraud detection device, comprising:

one or more processors; and memory storing instructions that, when executed by the one or more processors, cause the fraud detection device to:

obtain a fraud detection database comprising:

a set of account nodes, each account node in the set of account nodes comprising:

a unique identifier;

an account number;

version data; and a suspicious account indicator indicating if the account node corresponds to a suspicious account;

a set of attribute nodes, each attribute node in the set of attribute nodes comprising a value;

a set of edge data, each edge in the set of edge data linking an account node to an attribute node and comprising:

a label corresponding to the value in the attribute node; and an edge weight;

a set of query nodes, a query node in the set of query nodes comprising an account number from the set of account nodes; and a set of query edge data, each query edge in the set of query edge data linking a query node to the account node having the account number corresponding to the account number in the linked query node;

obtain updated account data comprising an updated account number;

determine a corresponding account node in the set of account nodes, where the corresponding account node has an account number corresponding to the updated account number;

generate an updated account node comprising a unique identifier, the updated account number, a suspicious account identifier, and version data comprising a version indicator incremented based on the version data for the corresponding account node;

generate updated edge data based on the edges linking the corresponding account node to an attribute node;

insert the updated account node into the fraud detection database;

insert the updated edge data, wherein each edge in the updated edge data links the updated account node to an attribute node in the set of attribute nodes;

obtain corrective account data comprising an account number;

determine that the account number of the corrective account data corresponds to the account number of the updated account node;

generate a corrective account node comprising a unique identifier, the account number, a suspicious account identifier, and version data incremented based on the version data for the updated account node;

set the suspicious account indicator for the updated account node such that the updated account node is indicated as a suspicious account;

generate corrective edge data based on the edges linking the corresponding account node to an attribute node;

insert the corrective account node into the fraud detection database;

insert the corrective edge data, wherein each edge in the updated edge data links the corrective account node to an attribute node in the set of attribute nodes; and calculate, for each account node in the set of account nodes, a fraud proximity score based on the edge weights for each edge between the account node and at least one account node indicated as a suspicious account based on the suspicious account indicator for the account node.

17. The fraud detection device of claim 16, wherein the instructions, when executed by the one or more processors, further cause the fraud detection device to:

obtain whitelist data comprising a set of whitelist values; and for each attribute node in the fraud detection database having a value corresponding to a whitelist value in the whitelist data, set the edge weight of each edge linking the attribute node to an account node to zero.

18. The fraud detection device of claim 16, wherein the instructions, when executed by the one or more processors, further cause the fraud detection device to normalize the fraud proximity score for an account node based on a total number of paths that end at an account node indicated as suspicious within the fraud detection database.

19. The fraud detection device of claim 16, wherein the instructions, when executed by the one or more processors, further cause the fraud detection device to calculate the fraud proximity score for an account node based on a length of a relationship from the account node to at least one account node indicated as suspicious and a total number of paths that end at the at least one account node indicated as suspicious and originating from the account node.

* * * * *